(12) United States Patent
Phan

(10) Patent No.: US 7,475,024 B1
(45) Date of Patent: Jan. 6, 2009

(54) SYSTEM AND METHOD FOR DISTRIBUTING IN REAL-TIME, INVENTORY DATA ACQUIRED FROM IN-STORE POINT OF SALE TERMINALS

(75) Inventor: Cung Ngoc Phan, Anaheim, CA (US)

(73) Assignee: Microsoft Corporation, Redmond, WA (US)

( * ) Notice: Subject to any disclaimer, the term of this patent is extended or adjusted under 35 U.S.C. 154(b) by 1602 days.

(21) Appl. No.: 09/736,554

(22) Filed: Dec. 13, 2000

(51) Int. Cl.
G06Q 30/00 (2006.01)
G06Q 10/00 (2006.01)
G06F 17/30 (2006.01)

(52) U.S. Cl. .............................. 705/26; 705/27; 705/28
(58) Field of Classification Search ................ 705/22, 705/26, 27, 28
See application file for complete search history.

(56) References Cited

U.S. PATENT DOCUMENTS

| | | | |
|---|---|---|---|
| 4,530,067 A * | 7/1985 | Dorr ............................ 705/15 |
| 4,992,940 A | 2/1991 | Dworkin |
| 5,638,519 A * | 6/1997 | Haluska ........................ 705/28 |
| 5,745,036 A * | 4/1998 | Clare ....................... 340/572.1 |
| 5,854,746 A | 12/1998 | Yamamoto et al. |
| 5,991,739 A | 11/1999 | Cupps et al. |
| 6,023,683 A * | 2/2000 | Johnson et al. ............... 705/26 |
| 6,076,071 A * | 6/2000 | Freeny, Jr. .................... 705/26 |
| 6,078,900 A * | 6/2000 | Ettl et al. ....................... 705/28 |
| 6,081,789 A * | 6/2000 | Purcell ......................... 705/37 |
| 6,119,101 A | 9/2000 | Peckover |
| 6,324,522 B2 * | 11/2001 | Peterson et al. ............... 705/28 |
| 6,401,076 B1 * | 6/2002 | Hall et al. ..................... 705/22 |
| 6,415,318 B1 * | 7/2002 | Aggarwal et al. ........... 709/206 |
| 6,418,441 B1 * | 7/2002 | Call ............................ 707/10 |
| 6,477,578 B1 * | 11/2002 | Mhoon ....................... 709/229 |
| 6,484,149 B1 * | 11/2002 | Jammes et al. ................ 705/26 |
| 6,922,676 B2 * | 7/2005 | Alnwick ....................... 705/28 |
| 7,039,603 B2 * | 5/2006 | Walker et al. ................. 705/26 |

(Continued)

FOREIGN PATENT DOCUMENTS

JP 11-154280 A * 6/1999

(Continued)

OTHER PUBLICATIONS

Microsoft Press Computer Dictionary, Third Edition, 1997, Microsoft Press, Redmond, Washington, p. 462.*

(Continued)

Primary Examiner—Nicholas D Rosen
(74) Attorney, Agent, or Firm—Leanne Taveggia Farrell; Westman, Champlin & Kelly, P.A.

(57) ABSTRACT

A system and method for providing real-time point-of-sale inventory data transmission over a distributed computer network is herein disclosed. The distributed computer network includes a plurality of consumer computers in communication with a processor and memory apparatus by a first communication link. The processor and memory apparatus capable of being connected by one or more communications links to a plurality of merchants' point-of-sale systems. The process and memory machine includes a database having a capability to store data and a web server having a capability to store data and process requests for merchant inventory data by consumer computers. The process and memory machine executes real-time inventory transmission with a plurality of merchants and a plurality of consumers over the distributed network.

11 Claims, 6 Drawing Sheets

U.S. PATENT DOCUMENTS

| | | | | |
|---|---|---|---|---|
| 2001/0037245 A1* | 11/2001 | Ranganath et al. | | 705/16 |
| 2002/0023004 A1* | 2/2002 | Hollander et al. | | 705/22 |
| 2002/0032611 A1* | 3/2002 | Khan | | 705/26 |
| 2002/0062310 A1* | 5/2002 | Marmor et al. | | 707/3 |
| 2002/0072984 A1* | 6/2002 | Rothman et al. | | 705/26 |
| 2003/0033205 A1* | 2/2003 | Nowers et al. | | 705/26 |
| 2006/0195368 A1* | 8/2006 | Walker et al. | | 705/26 |
| 2007/0112633 A1* | 5/2007 | Walker et al. | | 705/21 |

FOREIGN PATENT DOCUMENTS

| | | |
|---|---|---|
| WO | WO-9967730 A1 * | 12/1999 |
| WO | WO-0070515 A1 * | 11/2000 |

OTHER PUBLICATIONS

Anon., "Web Wise: The Internet Offers Many Benefits to Smart Retailers," Chain Store Age with Shopping Center Age, vol. 73 No. 11, p. 22B, Nov. 1997.*

Anon., "firstsource.com's Board of Directors Adds Mark Briggs to its Roster," PR Newswire, p. 3221, Nov. 1, 1999.*

Anon., "Elan Hotel Modern Chooses TENonline Technology to Facilitate Internet Initiative," PR Newswire, Sep. 12, 2000.*

The Microsoft Press Computer Dictionary, third edition, Microsoft Press, Redmond, 1997, pp. 238, 430, 462, and 505.*

Anon., "ArsDigita Powers Nation's Leading Online Wine Exchange: WineAccess.com," Business Wire, Jul. 17, 2000.*

Anon., "An Informational Release Regarding CyberMall Inc., Progress on its Interactive Virtual Mall and Search Engine Projects," Busienss Wire, p. 06120446, Jun. 12, 1996.*

Microsoft Press Computer Dictionary, Third Edition, Microsoft Press, Redmond, 1997, p. 247.*

YAHOO!; Real-time Inventory for Yahoo!Store; On-line Web page at http://store.yahoo.com/rtinv.html.

Carol Sliwa; "Dot-Coms Seek Synergy with Retail Parents—Links to store, catalog systems remain rare"; ComputerWorld; V34, N5; Jan. 31, 2000.

Ephraim Schwartz; "Brick-and-Mortars Take the E-commerce Plunge"; InfoWord; V22, Issue 14; Apr. 3, 2000.

* cited by examiner

Figure 2

| SKU Number | Description | Unit Price | Sale Price | Qty. OnHand | ... |
|---|---|---|---|---|---|
| 105567 | Philips 17" monitor - Outstanding 1280 x 1024 resolution and magnificent .26mm dot pitch. | 249.99 | 219.99 | 35 | ... |
| 167623 | Laptop Computer - Intel Pentium II 266Mhz with 64MB of SDRAM, 4.0GB Hard Drive, 13.3" TFT Display | 1422.40 | 1390.50 | 15 | ... |
| ... | ... | ... | ... | ... | ... |

Store Table

| Store ID | Store Address | Store Name | Network Address | Last Connected | |
|---|---|---|---|---|---|
| 1 | 123 Main Street Anaheim, CA 92907 | ACME Electronics | 201.1.132.104 | 10/10/00 12:30:10 | ... |
| 2 | 55 First Avenue Santa Clara, CA 90000 | Discount Electronics | 203.11.32.192 | 10/10/00 12:35:15 | ... |
| 3 | 1234 Unit A, Simon Circle San Diego, CA 91111 | ABC Store | 211.12.3.186 | 10/10/00 12:30:10 | ... |
| ... | | | ... | ... | ... |
| 300 | 301 | 302 | 303 | 304 | |

Inventory Table

| SKU Number | Description | Unit Price | Sale Price | Qty. OnHand | Store ID | Last Updated |
|---|---|---|---|---|---|---|
| 105567 | Philips 17" monitor - Outstanding 1280 x 1024 resolution and magnificent .26mm dot pitch. | 249.99 | 219.99 | 35 | 1 | 10/10/00 12:30:10 |
| 105567 | Philips 17" monitor - Outstanding 1280 x 1024 resolution and magnificent .26mm dot pitch. | 218.99 | 199.00 | 3 | 2 | 10/10/00 12:35:15 |
| 167623 | Laptop Computer - Intel Pentium II 266Mhz with 64MB of SDRAM, 4.0GB Hard Drive, 13.3" TFT Display | 1422.40 | 1390.50 | 15 | 1 | 10/10/00 12:30:10 |
| ... | ... | ... | ... | ... | ... | ... |
| 310 | 311 | 312 | 313 | 314 | 315 | 316 |

SYSTEM AND METHOD FOR DISTRIBUTING IN REAL-TIME, INVENTORY DATA ACQUIRED FROM IN-STORE POINT OF SALE TERMINALS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

This invention relates to in-store point-of-sale systems, and, more specifically, to methods and systems for processing and distributing up-to-the-minute merchandising and inventory data over a communication network such as the Internet.

Electronic merchandising systems currently exist which allow consumers to purchase goods and services from a variety of different merchants over a distributed computer network such as the Internet. With systems of this type, the merchants typically establish a virtual store on a network that consumers can interactively view with a personal computer. The consumers can then purchase items offered for sale by the merchant in the virtual store.

In World Wide Web ("web") based implementations, the virtual stores are in the form of hypertext documents, which are hosted by the websites of the respective merchants. Typically, a website is an Internet-connected computer or computer system which runs server software for serving information using standard protocols of the World Wide Web. In other implementations, a centralized computer of an online services network, for example, the Microsoft Network, Earthlink, Yahoo!Shopping, or an Internet site using proprietary applications software, may host the merchants' hypertext documents. The hypertext documents are typically accessed using a standard web browser application that runs on the consumer's computer.

For example, a consumer may direct his or her web browser to access a merchant's hypertext documents describing the items that interest the consumer. Upon viewing a desired good or service, the consumer fills out an electronic order-form that specifies the name of the consumer, a shipping address, billing information, the desired good or service, etc. The consumer's web browser then transmits the electronic order-form to the merchant's website. Upon receiving the electronic order-form, the merchant's website processes the electronic order-form to complete the sales transaction. The order-form is then sent to the merchant's fulfillment center for processing and the goods are sent to the consumer by way of U.S. Mail, Federal Express, United Parcel Service, or similar shipping carriers.

Although consumers clearly reap many benefits in today's electronic marketplace, there are still many disadvantages that lead to consumer frustration and expense. Even if merchants could easily identify willing consumers, it is difficult for a merchant to deliver up-to-date information directly to a consumer who is ready to buy. Merchants selling on both a virtual store and a brick-and-mortar store usually synchronize inventory information (available quantity, sale price, etc.) between the stores at fixed intervals because of the time required to reprogram and update the website. Therefore there is a lag between the time the information is posted on the website and the time the willing consumer comes into contact with the website.

An uncertainty is therefore created as to the validity of the information on the website concerning the actual goods or services available by the merchants. As a result many consumers are exposed to misinformation on the merchants' websites. The consumer has no way of knowing if the goods or services represented on the merchants' websites are an accurate representation as to their true description, price, or quantity at the time of viewing the website. Such stale information negatively affects the consumers, the merchants and the marketplace as a whole.

An in-store or telephone salesperson could assist the consumer in determining the availability, features, and price of an item, but only if the consumer has previously learned that the store carries suitable products and services. If the website does not accurately inform the consumer that such goods or services exist, then the consumer will never be inclined to contact the merchant. Merchants need a mechanism for delivering current information to consumers precisely at the moment when it is most helpful to the consumer.

Consumers are presented with many options to purchase goods and services on the Web, a successful merchant needs the best looking and most informative website, along with the lowest prices, to be successful. Such a website requires talented and expensive programmers to design and maintain. Merchants therefore incur great expense in establishing, updating, maintaining, and servicing a web-based merchandising site. Many small and medium-sized retailers are not technically sophisticated and cannot afford to spend the time or money required to keep a cutting edge website up and running. Therefore, they often use e-commerce hosting services such as Yahoo!Shopping, bCentral, etc., to sell on the Web.

These services typically charge a percentage of the sales made through the website as a monthly fee for hosting the merchant's virtual store. In addition to providing the server software required to run a virtual store, some services provide a means to perform real-time inventory checking. In this scheme, the hosting service software will issue queries in the form of HTPP POST requests to the merchant's web server to determine the current inventory data. The hosting service will also query the merchant's web server to determine current inventory when a new item is added to the shopping cart feature of the website and subsequently when the user confirms an order. This scheme requires the merchant to have a permanent connection to the computer network (a fixed IP address or URL) and a web server that can provide responses to the requests for inventory data. These requirements preclude a vast majority of small and medium-sized retailers from offering real-time inventory checking on virtual stores using hosting services.

Also, some brick-and-mortar retailers may not be interested in selling on the web, but want to use the web to advertise what they sell in their stores to attract on-line customers to their brick-and-mortar stores. By sending information on the items currently available at their stores to a centralized database, merchants can make this information instantly available to on-line consumers. The consumers benefit because they can save time and money by searching and then patronizing only the stores that positively have the desired items in stock and ready for sale. Thus there is a need in the market for a system to distribute inventory data in real-time to ensure that the consumer is getting the most accurate and up-to-date information about a desired purchase, and for the brick-and-mortar merchant to effectively and economically compete in the age of electronic commerce.

SUMMARY OF THE INVENTION

The primary object of the invention is to provide merchants a system and method for distributing in real-time, inventory data acquired from in-store point of sale terminals.

Another object of the invention is to provide a system and method to: acquire inventory data from point-of-sale systems in participating merchant's stores; store the collected data and provide merchants and consumers easy access to this data.

Another object of the invention is to provide location information of retailers to consumers so consumers may make an immediate purchase and pick-up the desired items in person, instead of traveling all over town from store to store or waiting on hold when calling merchants over the telephone to determine if the desired items are actually sold by the merchant, currently in stock, and available for immediate sale.

A further object of the invention is to provide retailers a portal for easy access by consumers using many devices.

Other objects and advantages of the present invention will become apparent from the following descriptions, taken in connection with the accompanying drawings, wherein, by way of illustration and example, an embodiment of the present invention is disclosed.

A system for providing real-time point-of-sale inventory data transmission over a distributed computer network is herein disclosed. The distributed computer network includes a plurality of consumer computers in communication with a processor and memory apparatus by a first communication link. The processor and memory apparatus capable of being connected by one or more communications links to a plurality of merchants' point-of-sale systems. The process and memory machine includes a database having a capability to store data and a web server having a capability to store data and process requests for merchant inventory data by consumer computers. The process and memory machine executes real-time inventory transmission with a plurality of merchants and a plurality of consumers over the distributed network.

A process for real-time inventory transmission comprising the steps: communicating with merchants' computers through a computer network, associating with each merchant real-time data representing the current inventory possessed by the particular merchant, storing merchant data associated with the particular merchant in a database, establishing web server computers to be accessed by a consumer through a network connection, receiving a request for merchant inventory data from at least one of the consumer computers, selecting inventory data that is compatible with the requesting consumer's inventory request, and providing real-time inventory data to the requesting consumer.

The drawings constitute a part of this specification and include exemplary embodiments to the invention, which may be embodied in various forms. It is to be understood that in some instances various aspects of the invention may be shown exaggerated or enlarged to facilitate an understanding of the invention.

BRIEF DESCRIPTION OF THE DRAWINGS

FIG. 2 shows a data structure of an example point-of-sale database, FIG. 3 shows a data structure of an example host system database including a data structure of merchant store identification information and a data structure of currently available inventory information.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
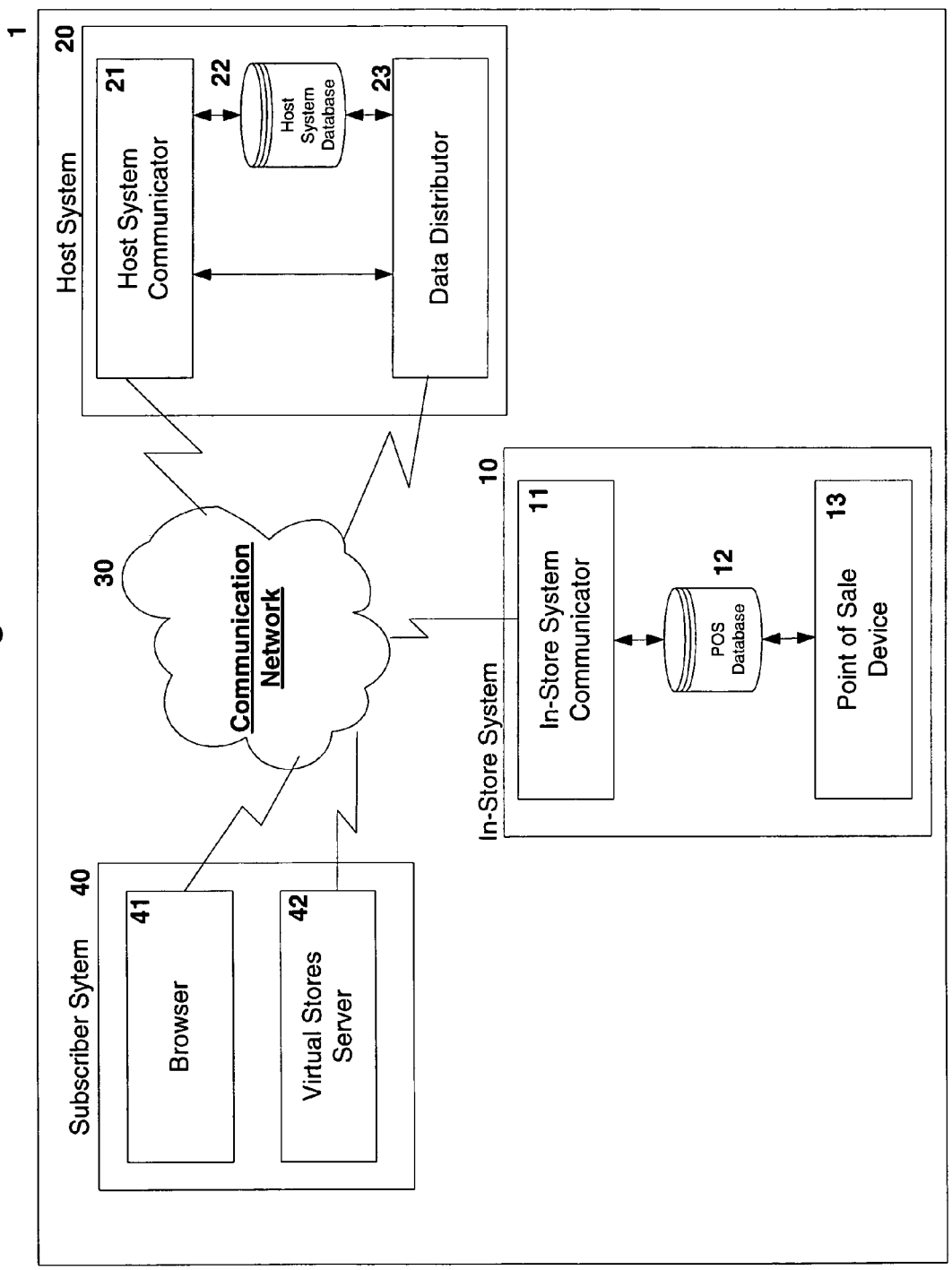
FIG. 1 is a functional diagram illustrating the various functional blocks of a system for distributing real-time inventory data over a network in accordance with the invention.

FIG. 1 shows a functional diagram of an embodiment of the system 1 for distributing inventory data in real-time, in accordance with the present invention. The system 1 includes as a minimum, an in-store system 10, a host system 20, a communication network 30, and a subscriber system 40. The in-store system 10 is located at each merchant's store and is comprised of an in-store system communicator program 11, a point-of-sale (POS) database 12, and a point-of-sale device 13.

The point of sale device 13 provides the functions required to perform sales transactions and maintain up-to-date inventory and sales data in the POS database 12. As each item is sold, the quantity on hand will be decremented by the point-of-sale device 13 and updated in the POS database 12. Likewise, when an item is replenished, its on-hand quantity is updated, thus the POS database always contains the latest sales and inventory information. The point-of-sale device 13 can be any PC-based point-of-sale terminal and may include a magnetic card reader and/or bar code scanner, cash drawer, scale, receipt printer, etc. Systems performing the functions of the point-of-sale device 13 exist in the current art and are not explained herein.

The in-store system communicator program 11 may run on the same computer that is used for the point-of-sale device 13, or on a computer in a network that can have access to the POS database 12. In-store system 10 has a connection to the communication network 30, which is used to transmit inventory data. The in-store system communicator 11 establishes a connection through communication network 30 to the host system communicator 21 for sending data to the host system 20; in-store communicator 11 also listens for commands and data coming from the host system communicator 21 over communications network 30. When in-store communicator 11 receives a command to retrieve inventory data, it accesses the POS database 12 and immediately formulates and transmits a response using the current data stored in POS database 12. Thus, the information being routed between the in-store system 10 and the host system 20 occurs in real-time. In other embodiments, the in-store system communicator 11 may be incorporated into the point-of-sale device 13.

The host system 20 shown in FIG. 1 receives inventory data from one or more in-store system 10 through the communication network 30 and distributes the information to one or more subscriber system 40. The host system 20 comprises a host system communicator program 21, a host system database 22, and a data distributor 23. The host system communicator 21 listens for incoming data messages from one or more in-store system communicator 11. When the in-store system communicator 11 is started, it sends a message to the host system communicator 21 to identify the originating store and its current network address. Thus, the store's network address does not need to be fixed or known in advance by the host system communicator 21. This communication scheme eliminates the need for a fixed IP address at each store when the TCP/IP protocol is used. The current network address is thus indexed with the store identification data and stored in the host system database 22. When given store identification data, the host system communicator 21 can look up the network address in the host system database 21 and use it to initiate a connection to the in-store system communicator 11. The in-store system communicator 11 can also send inventory data such as item description, quantity, pricing, UPC code, etc. to the host system communicator 21 on demand or periodically at set intervals. Upon receipt, the host system communicator 21 catalogs and stores the information in the host system database 22 for use by the data distributor 23.

The data distributor 23 is a general web server having a capability to: receive a request for merchant data from one or more subscriber system 40; direct the host communicator 21 to immediately retrieve the data from the in-store system 10 or look up the data from the host system database 22 when the inventory data is already available or when the in-store system cannot be reached; and formulate a response to the subscriber system 40.

The subscriber system 40 shown in FIG. 1 comprises a browser 41 or a virtual stores server 42. The browser 41 can be any general-purpose web browser such as Internet Explorer or Netscape Navigator. The customer uses the browser to access the merchant inventory data available from the data distributor 23. In this preferred embodiment, the browser 41 can point to a web page located on the data distributor 23 to search for the available quantity or pricing information of one or more desired items from a particular store, or perform a search for which stores have one or more desired items in stock, or to look up the description of an item.

The virtual stores server 42 is a web server that hosts virtual stores. Systems performing the functions of the virtual stores server 42 exist in current arts, such as Yahoo!Shopping, and are not explained herein. On-line customers browse the virtual store or stores hosted on this virtual stores server 42 to make a purchase on the Web. To provide real-time inventory data to the consumers, the virtual stores server 42 makes a request for an inventory check to the data distributor 23 when the online catalog is listed, a new item is added to the consumer's shopping cart, or subsequently when the consumer confirms an online order. Unique to this invention, such inventory requests are made directly to the host system 20, which has a permanent connection to the Internet. This way, in-store system 10 does not have to run a web server, or have a fixed IP address, or be permanently connected to the Internet to process inventory check requests.

The communication network 30 shown in FIG. 1 can be a local area network, wide area network, or the Internet, and has the capability to support a variety of protocols such as TCP/IP, HTTP, HTTPS, etc.

FIG. 2 shows an example of inventory information stored in the POS database 12. In FIG. 2, numeral 200 denotes an stock keeping unit (SKU) number (or item lookup code for identifying individual items), numeral 210 denotes a description of individual items, numeral 220 and numeral 230 denotes an area for storing a unit price of the item and the sale price to be applied when the item is on sale, and numeral 240 denotes the quantity currently in stock for the item. Additional information not related to the invention may be stored in this table for use by the point-of-sale device; for example, sales transaction history, customer account information, etc.

FIG. 3 shows an example of the contents of the host system database 22. For clarity, the information has been grouped under two data tables: the store table which contains data related to the merchant's store, and the inventory table which contains data related to the inventory items that are made available to the host system by the merchant. In FIG. 2, numeral 300 denotes an area for storing the store identification number. Each store participating in the distribution system is given a unique number to be used for indexing. Numeral 301 in FIG. 3 denotes the store's address and numeral 302 denotes the store's name. When the in-store system communicator 11 is started, it sends a message to the host system communicator 21 to identify the originating store and its network address. The host system communicator 21 stores the network address and the time when the connection is made in the areas denoted by numeral 303 and numeral 304 respectively. Additional information may be stored in this table, such as the store's phone and fax numbers, login name and password, etc.

When the in-store system communicator 11 sends an inventory update message, the host system communicator 21 receives and stores the data in the inventory table. The inventory table contains essentially the same information as in the POS database table shown in FIG. 2, but is indexed by the store identification number.

FIG. 3 shows an example of the contents of the host system database 22. For clarity, the information has been grouped under two data tables: the store table which contains data related to the merchant's store, and the inventory table which contains data related to the inventory items that are made available to the host system by the merchant. In FIG. 3, numeral 300 denotes an area for storing the store identification number. Each store participating in the distribution system is given a unique number to be used for indexing. Numeral 301 in FIG. 3 denotes the store's address and numeral 302 denotes the store's name. When the in-store system communicator 11 is started, it sends a message to the host system communicator 21 to identify the originating store and its network address. The host system communicator 21 stores the network address and the time when the connection is made in the areas denoted by numeral 303 and numeral 304 respectively. Additional information may be stored in this table, such as the store's phone and fax numbers, login name and password, etc.

Figure 4:
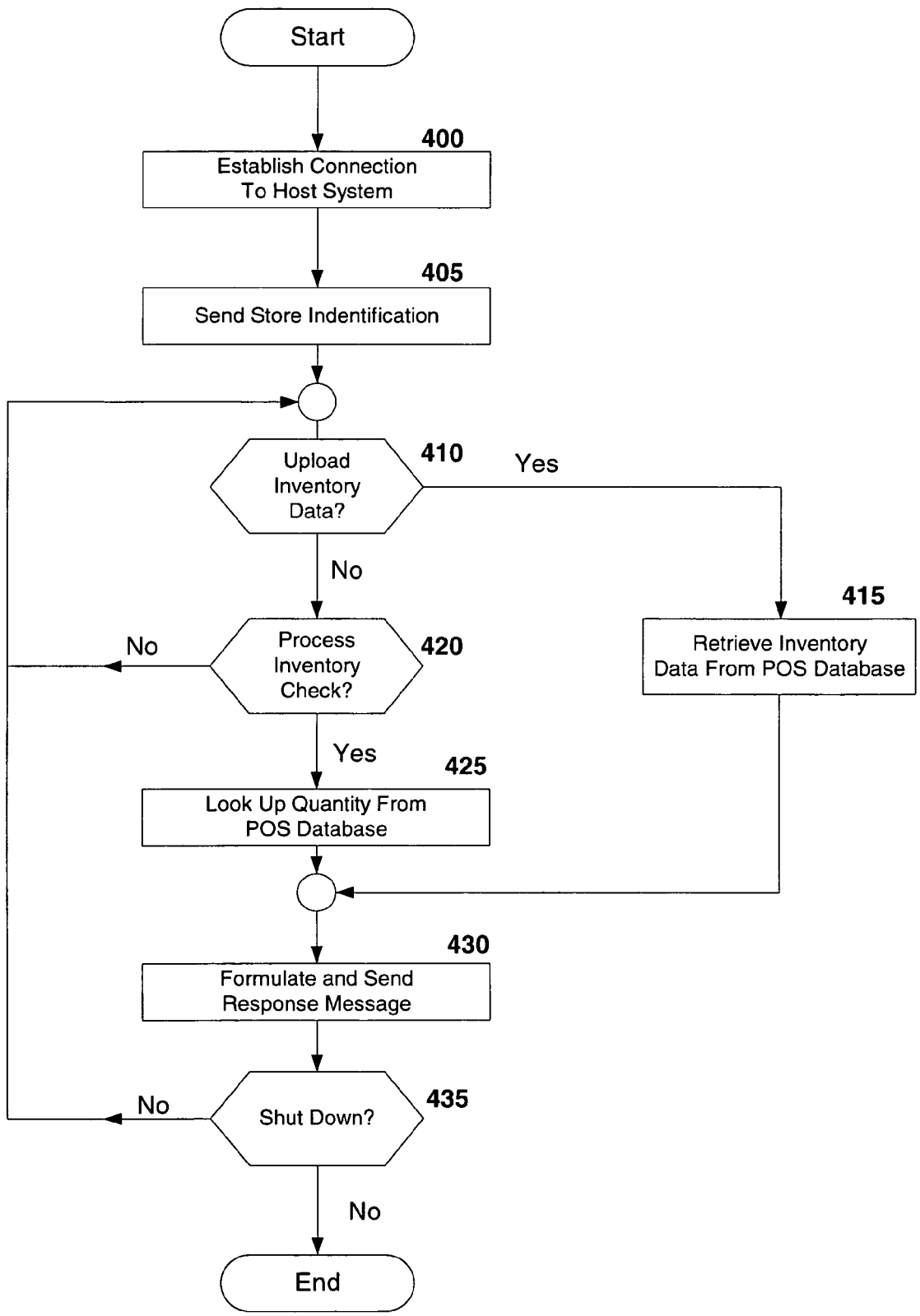
FIG. 4 shows a flow chart of a process conducted when performing a merchant point-of-sale inventory update to the host system database.

FIG. 4 shows a simplified flow chart of a process conducted by the in-store system communicator 11 in accordance with the present embodiment. The in-store system communicator 11 performs three main functions: login to the host system and send identification data, upload inventory data, and process inventory check requests. When the program is started, it establishes a connection (step 400) to the host system communicator 21 through the communication network 30. Authentication may be used to ensure that only authorized members are allowed to login. Once the connection has been established, store identification data is sent (step 405). The network address may be sent as a part of the message or sent automatically as part of the communication protocol used in establishing a connection in step 400. The store identification data is used to uniquely identify from which store in the network the information is being sent. The in-store system communicator 11 then listens for incoming requests from the host system communicator 21. If a request for upload inventory data is detected (step 410), the POS database 12 is accessed by in-store communicator 11 to retrieve the data for uploading (step 415). A response is formulated and sent by the in-store communicator 11 (step 430) to the host system communicator 21. If a request for inventory check is detected (step 420), the SKU number 200 in the POS database 12 is used to look-up (step 425) the quantity on hand 240 for the requested item. A response is formulated and sent from in-store communicator 11 to the host system communicator 21 (step 430). If a shutdown request is detected (step 435), the program will be terminated. Otherwise, the program will continue to listen for incoming requests.

Figure 5:
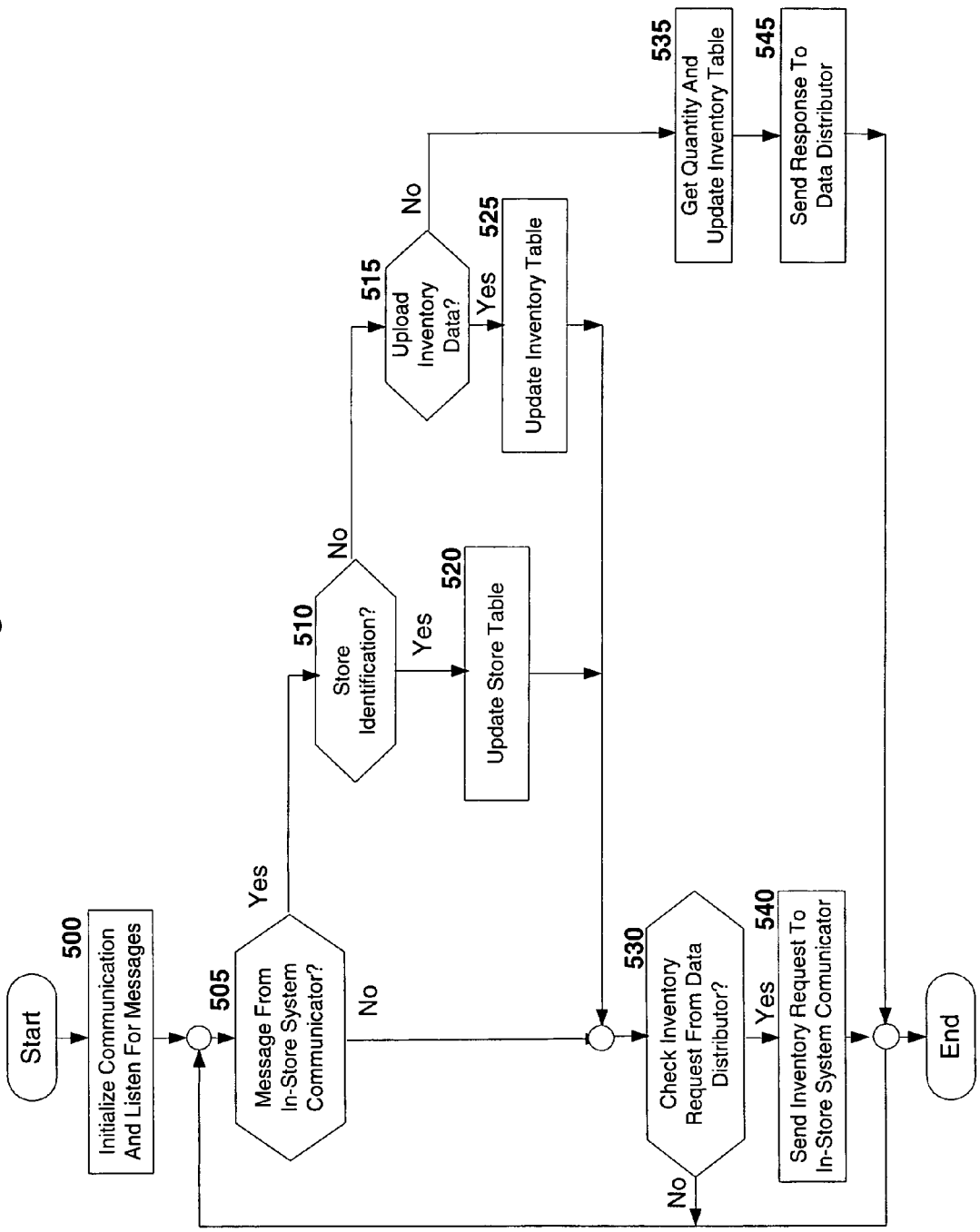
FIG. 5 shows a flow chart of a process conducted when performing an update to the host system database.

FIG. 5 shows a simplified flow chart of a process conducted by the host system communicator 21 in accordance with the present embodiment. The host system communicator 21 performs three main functions: process login to the host system 20 and identify sender, process inventory data uploaded from in-store system 10, and process inventory check request from the data distributor 23. When the program is started, it initializes a connection to the communication network 30 and continuously listens (step 500) for incoming messages from one or more in-store system communicators 11 in the network or the data distributor 23.

If a new message from the in-store system communicator 11 is detected (step 505) and the message contains store identification data (step 510), the network address 303 and the last connected time 304 in the host system database 22 are updated (step 520) for the corresponding store. If the message from the in-store communicator 11 contains inventory data (step 515), the corresponding data fields, indexed by the store identification 315 in the inventory table in the host system database 22 are also updated (step 525).

If the message from the in-store communicator 11 is a response to an inventory check request, the quantity on hand 314 for the item in the selected store is updated with the new data and a response containing the quantity on hand is sent (step 545) to the data distributor 23.

If a check inventory request from the data distributor 23 is detected (530), an inventory check request is sent (step 540) to the corresponding in-store system communicator 11 that is indicated in the data distributor's 23 request.

Figure 6:
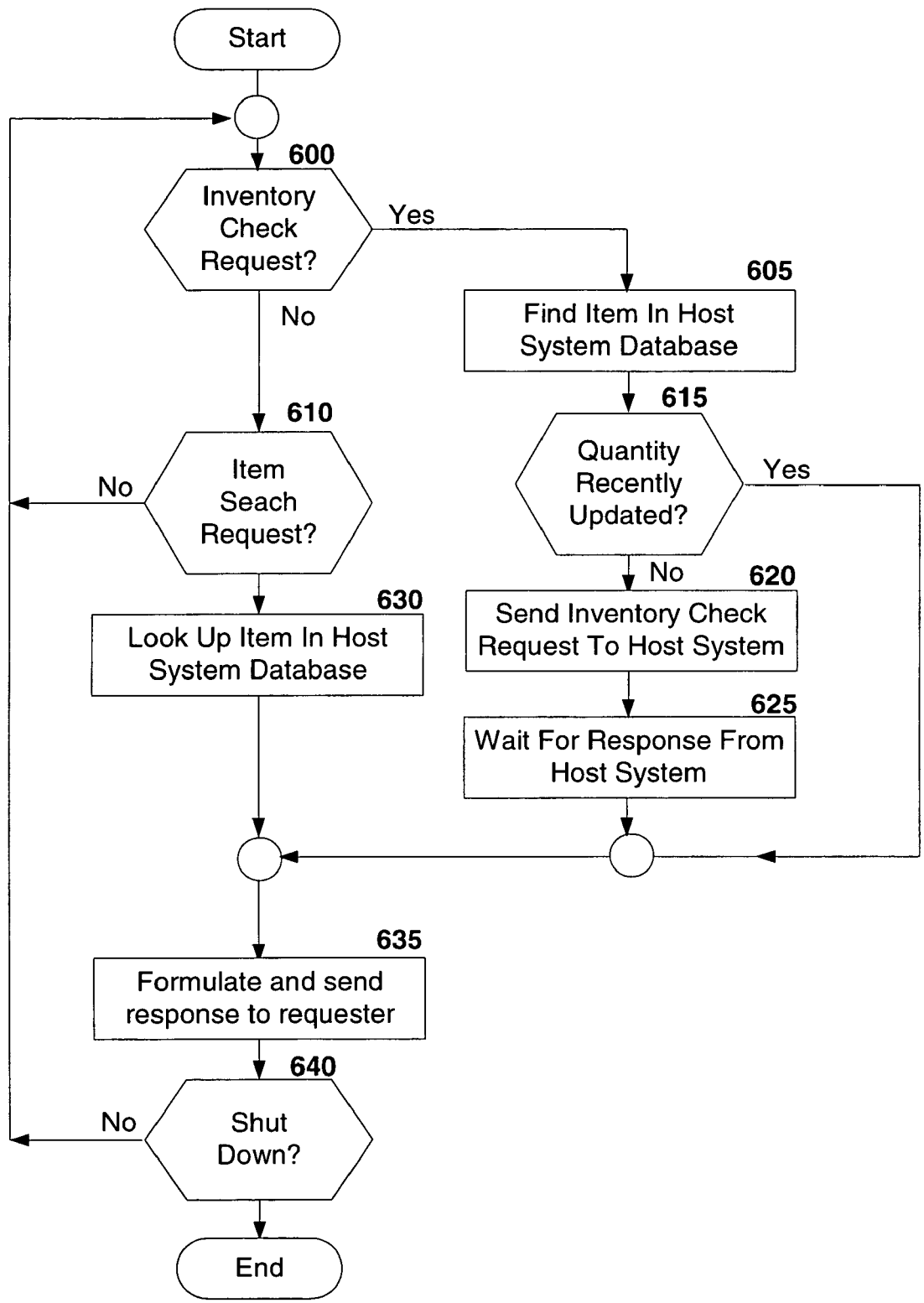
FIG. 6 shows a flow chart of a process conducted when performing a consumer inventory request and response.

FIG. 6 shows a simplified flow chart of a process conducted by the data distributor 23 in accordance with the present embodiment. The data distributor 23 processes inventory check or item search requests from one or more subscriber system 40. If an inventory check request is detected (step 600), the item identification (or SKU number) and the store identification number in the request is used to look up (step 605) the item in the host system database 22. The last updated field 316 is used to determine when the quantity on hand 314 was last updated for the item (step 615). If the field was recently updated (current time—last updated time is within a threshold value), the value in quantity on hand 314 is sent to the requester along with the time stamp of when the data was last updated 316 (step 635) without having to request the data from the store. This will minimize the response time in the case where the store has a slow connection to the host system.

If the value in the database is stale (within a threshold value), an inventory check request is automatically sent to the host system communicator 21 (step 620). Upon receiving a response with the quantity on hand 316 from the host system communicator 21 (step 625), a response is sent to the requesting subscriber system. The last known quantity in the host system database 22 may be sent in the case no response is received from the host system communicator 21.

If an item search request is received from a subscriber system 40 (step 610), a search of the inventory table (step 630) in the host system database 22 is conducted to find the item based on the item attributes stated in the request (SKU number, description, store identification, etc.). A response is formulated depending on the result of the search and sent to the requester (step 635). If a shutdown request is detected (step 640), the program is terminated. Although the present invention has been described with respect to a preferred embodiment thereof, those skilled in the art will understand that various substitutions may be made to those embodiments described herein without departing from the spirit and scope of the present invention. For example, in the present embodiment, the host system communicator program may be run on a computer separated from the data distributor, thus allowing faster throughput. Clustered host systems may be employed to divide up the workload and to enhance availability. The system can be used to route information other than inventory data between the subscriber systems to the in-store system. For example, on-line orders can be routed from the virtual stores server 42 to the in-store system 10 for processing and pick-up at the store. The messages may also be encrypted, compressed, or transmitted over a secure protocol such as HTTPS. Furthermore, many types of POS terminals, besides those requiring cashiers, are contemplated by the present invention.

What I claim as my invention is:

1. A computer implemented system for distributing in real-time, inventory data acquired from point-of-sale systems at any one of a plurality of retail systems, comprising:
   a plurality of in-store systems, each in-store system located at a place of business of a given merchant and comprising;
      at least one point-of-sale device used to process sales transactions for generating sales transaction data and generating inventory data;
      a memory database used to store a merchant identifier, the sales transaction data and the inventory data;
      an in-store communicator used to transmit the merchant identifier, a merchant network address and the inventory data over a communication network;
   a host system operably coupled to the in-store systems over the communication network and comprising:
      a host system database for indexing and storing the inventory data, the merchant identifier and the merchant network address for each in-store system;
      a host system communicator used to receive and transmit data;
      a data distributor for processing requests for inventory data by accessing the inventory data stored in the host system database or retrieving inventory data from one of the in-store systems;
   a subscriber system operably coupled to the host system over the communication network and comprising:
      a virtual store server configured to request the host system for inventory data indicative of the given merchant, to receive inventory data from the host system and to process online sales of goods or services offered for sale by the given merchant; and
      a browser component useable by a consumer to view the requested inventory data from the host system by accessing the requested inventory data on a web page generated by the data distributor.

2. The computer implemented system of claim 1, wherein the in-store systems, the subscriber systems and the host system are coupled to one another through a communication network configured to transmit and receive data among the in-store systems, the subscriber systems, and the host system, and to support one of a transmission control protocol/internet protocol (TCP/IP) and hypertext transfer protocol (http).

3. The computer implemented system of claim 1, wherein the inventory data is sent periodically from the in-store systems to the host system, and wherein the host system is configured to either forward the inventory data to the subscriber system or store the inventory data in the host system for later access by the subscriber system.

4. The computer implemented system of claim 1, wherein the host system looks up the merchant network address from the host system database using the merchant identifier to initiate a connection to one of the in-store systems for retrieving the inventory data.

5. The computer implemented system of claim 1, wherein the data distributor processes requests for inventory data by accessing the inventory data stored in the host system database for the merchant if the in-store system that corresponds to the merchant can not be reached.

6. The computer implemented system of claim 1, wherein the data distributor processes requests for inventory data by requesting one of the in-store systems for inventory data if the in-store system that corresponds to the merchant can be reached.

7. The computer implemented system of claim 1, wherein the browser component is further able to point to a web page generated by the data distributor to search for quantity and pricing information for a desired item.

8. The computer implemented system of claim 1, wherein the browser component is further able to point to a web page generated by the data distributor to a search which merchants who are in communication with the host system have desired items in stock.

9. The computer implemented system of claim 1, wherein the host system comprises a permanent connection to the Internet while the in-store system fails to be connected to the Internet.

10. The method of claim 1, wherein retrieving inventory data from the in-store system in response to receiving a request for the inventory data comprises retrieving inventory data if the in-store system that corresponds to the merchant can be reached.

11. The method of claim 1, further comprising providing a permanent connection to the Internet while the in-store system fails to be connected to the Internet.

\* \* \* \* \*